United States Patent
De Rossi et al.

(10) Patent No.: US 9,458,339 B2
(45) Date of Patent: Oct. 4, 2016

(54) ELECTRON BEAM-CURABLE INKJET INKS AND USE THEREOF IN INKJET PRINTING METHODS

(71) Applicant: MANKIEWICZ GEBR. & CO. GMBH & CO. KG, Hamburg (DE)

(72) Inventors: Umberto De Rossi, Norderstedt (DE); Oliver Bolender, Hamburg (DE)

(73) Assignee: MANKIEWICZ GEBR. & CO. GMBH & CO. KG, Hamburg (DE)

(*) Notice: Subject to any disclaimer, the term of this patent is extended or adjusted under 35 U.S.C. 154(b) by 0 days.

(21) Appl. No.: 14/422,702

(22) PCT Filed: Aug. 21, 2013

(86) PCT No.: PCT/DE2013/000468
§ 371 (c)(1),
(2) Date: Feb. 20, 2015

(87) PCT Pub. No.: WO2014/029381
PCT Pub. Date: Feb. 27, 2014

(65) Prior Publication Data
US 2015/0225585 A1    Aug. 13, 2015

(30) Foreign Application Priority Data
Aug. 24, 2012 (DE) .................. 10 2012 016 690

(51) Int. Cl.
*C09D 11/36* (2014.01)
*C09D 11/101* (2014.01)
*C09D 11/322* (2014.01)
*C09D 11/107* (2014.01)
*B41M 7/00* (2006.01)

(52) U.S. Cl.
CPC ............. *C09D 11/36* (2013.01); *C09D 11/101* (2013.01); *C09D 11/107* (2013.01); *C09D 11/322* (2013.01); *B41M 7/0081* (2013.01)

(58) Field of Classification Search
None
See application file for complete search history.

(56) References Cited

U.S. PATENT DOCUMENTS

| | | |
|---|---|---|
| 6,284,816 B1 | 9/2001 | Laksin et al. |
| 2002/0008691 A1 | 1/2002 | Hanajima et al. |
| 2005/0146544 A1* | 7/2005 | Kondo .................. C09D 11/30 347/7 |
| 2005/0253917 A1 | 11/2005 | Shang et al. |
| 2007/0263060 A1 | 11/2007 | Laksin et al. |
| 2007/0281245 A1 | 12/2007 | Overend et al. |
| 2008/0030562 A1* | 2/2008 | Sun ...................... C09D 11/101 347/102 |
| 2008/0087845 A1 | 4/2008 | Burth et al. |
| 2008/0108760 A1* | 5/2008 | Mano .................... C08G 18/42 525/455 |
| 2009/0301331 A1 | 12/2009 | Laksin et al. |
| 2010/0026743 A1* | 2/2010 | Van Thillo .............. B41J 2/175 347/9 |
| 2010/0156971 A1* | 6/2010 | Ikeda ................... B41J 2/0057 347/9 |
| 2010/0313782 A1 | 12/2010 | Loccufier et al. |
| 2011/0117350 A1 | 5/2011 | Künzel et al. |
| 2011/0274891 A1 | 11/2011 | de Rossi et al. |
| 2014/0347429 A1 | 11/2014 | Gould |

FOREIGN PATENT DOCUMENTS

| | | |
|---|---|---|
| CN | 102174283 A | 9/2011 |
| DE | 10 2008 005 685 A1 | 7/2009 |
| DE | 10 2008 023 499 A1 | 11/2009 |
| DE | 10 2008 063 837 A1 | 6/2010 |
| EP | 1 908 528 A2 | 4/2008 |
| EP | 2 053 101 A1 | 4/2009 |
| EP | 2 133 210 A2 | 12/2009 |
| JP | 2003-182061 A | 7/2003 |
| JP | 2004-98309 A | 4/2004 |
| WO | WO 2005/061634 A1 | 7/2005 |
| WO | WO 2013/093414 A2 | 6/2013 |

OTHER PUBLICATIONS

"Evaporation Rates of Solvents", Siegwerk Switzerland AG, Technical Data Sheet, pp. 1-2 (2008).

* cited by examiner

Primary Examiner — An Do
Assistant Examiner — Renee I Wilson
(74) Attorney, Agent, or Firm — Norman B. Thot

(57) ABSTRACT

An inkjet ink which is electron beam curable includes 10 to 40 wt.-% of at least one oligomer based on a total weight of the inkjet ink, 5 to 25 wt.-% of at least one reactive thinner based on the total weight of the inkjet ink, 25 to 84 wt.-% of a solvent mixture comprising at least two solvents based on the total weight of the inkjet ink, and 1 to 15 wt.-% of at least one pigment based on the total weight of the inkjet ink. The at least two solvents have a boiling point of from 50 to 300° C., a dielectricity constant of from 5 to 20, and an evaporation rate of 3 to 5000. The evaporation rate of the at least two solvents differs by a factor of from 2 to 10. The inkjet ink is free from photoinitiators.

16 Claims, No Drawings

ELECTRON BEAM-CURABLE INKJET INKS AND USE THEREOF IN INKJET PRINTING METHODS

CROSS REFERENCE TO PRIOR APPLICATIONS

This application is a U.S. National Phase application under 35 U.S.C. §371 of International Application No. PCT/DE2013/000468, filed on Aug. 21, 2013 and which claims benefit to German Patent Application No. 10 2012 016 690.7, filed on Aug. 24, 2012. The International Application was published in German on Feb. 27, 2014 as WO 2014/029381 A2 and WO 2014/029381 A9 under PCT Article 21(2).

FIELD

The present invention relates to electron beam curable inks and methods for applying and hardening inks by means of the inkjet technology, as well as the use of the inks for printing substrates, in particular plastic foils for food packages.

BACKGROUND

By inkjet technology is meant a printing method with which a printed image is generated by the targeted launch or the deflection of ink droplets. These methods have been used in the graphic market for several years. Water and solvent-based inks as well as UV-hardening inks are primarily used. Water- or solvent-based inks usually dry by evaporation of the solvent. UV-hardening inks dry via a hardening process which is initiated through UV-radiation. The UV-hardening inks are thereby irradiated shortly after application on a substrate with a UV-lamp. Since the UV-hardening inks harden independently of the evaporation of their solvents, the printed substrates can be further processed substantially earlier and therefore enable considerably shorter process times or significantly rapid processes.

Another advantage of UV-hardening inks is an earlier manipulation. Contrary to water or solvent based inks which dry by evaporation, UV-hardening inks do not dry up in the print head and thereby save extensive cleaning of the head. UV-hardening inks also stick well to very different materials, among other things, on synthetic materials. The use of UV-hardening inks has therefore obtained a proper place in inkjet technology.

Usual UV-hardening ink formulations are based on acrylates. They can be hardened with UV light only to become a color coat when photoinitiators are contained in the formulations. The photoinitiators are excited by UV light and break down in radicals which release the polymerisation reactions of the acrylate oligomers. Mainly radicals with a defined structure are thereby built up which also react further to the polymers. It must be provided, however, that the photoinitiators do not lie in shadow zones since no excitation will there occur due to an absence of UV radiation with the result that the formation of chain starting radicals does not occur.

A further shortcoming of the UV technology is that residual portions of the reaction products always remain undefined since side reactions producing a large number of various products take place in addition to the main reactions. Said by-products are quite multifaceted and are only partially available in minimal quantities in the ppm range so that they are analytically very difficult to identify.

Fission or by-products can also appear directly in case of decomposition of the photoinitiator, which migrate from inks or color coats. A migration of undefined by-products is, however, not acceptable for a some applications, for example, in the food packages area. This is aggravated by the fact that the portions of the by-products mentioned can vary according to process parameters such as light intensity, speed and layer thickness.

Another shortcoming is that the UV-hardening ink can penetrate on porous substrates, i.e., it can be sucked up by the substrate. It thereby evades irradiation with UV-light, which in turn leads to an incomplete reaction of the acrylate oligomers. The incomplete reaction generates other by-products than in the case of a complete hardening. The by-products generally generate undesirable odours. The odor is generally more intensive the less the coat has hardened.

The undesirable by-products are usually not identifiable. They are therefore not accessible to classification according to the specifications of the use of print colors in the food sector. Since the evaluation of risks is not possible, UV-hardening inks have only very rarely been used for printing food packages and in other health-critical sectors such as, for example, for printing toys.

In order to use the advantages of the UV-hardening inks, photoinitiators are known which, due to their structure, have a reduced migration potential. This is achieved by producing larger molecules with a smaller migration tendency out of the original smaller photoinitiator molecules by derivatisation with bulky substituents. While this may avoid rapid migration, it does not avoid the tendency of undesirable by-products. Its reactivity is also reduced by the higher molar mass of the photoinitiator. The result in many sectors is an unacceptable reduction in processing speed. The derivatised photoinitiators are therefore only classified as suitable for indirect food contact.

SUMMARY

An aspect of the present invention is to provide means and methods which enable the production of improved color coats for printing substrates by preserving the technical advantages, in particular, the production of hygienically safe color coats with the help of the inkjet technology, which can, for example, also be used for printing food packages and children's toys.

In an embodiment, the present invention provides an inkjet ink which is electron beam curable which includes 10 to 40 wt.-% of at least one oligomer based on a total weight of the inkjet ink, 5 to 25 wt.-% of at least one reactive thinner based on the total weight of the inkjet ink, 25 to 84 wt.-% of a solvent mixture comprising at least two solvents based on the total weight of the inkjet ink, and 1 to 15 wt.-% of at least one pigment based on the total weight of the inkjet ink. The at least two solvents have a boiling point of from 50 to 300° C., a dielectricity constant of from 5 to 20, and an evaporation rate of 3 to 5000. The evaporation rate of the at least two solvents differs by a factor of from 2 to 10. The inkjet ink is free from photoinitiators.

DETAILED DESCRIPTION

The use of the electron beam hardening has previously been described in the field of screen printing and offset printing. The print colors used there, however, have completely different properties than do inkjet inks. To enable application through the nozzles of the inkjet printer used to a substrate, inkjet inks must have, among other things, lower viscosities and a finer grain size distribution of the pigment and dye particles. The particle sizes of the pigments used in the inks according to the present invention are in the range of 10 to 1000 nm. Particle sizes of 50 to 600 nm can, for example, be used to achieve stability and the desired tinctorial strength.

Contrary to other printing technologies like offset or screen printing in which highly viscous, pasty colors are used as a rule, higher molecular weight components cannot readily be resorted to in the presence of low viscous inkjet inks so as to reduce the risk of migration. Larger quantities of reactive thinners must be added to an ink with an increased portion of higher molecular weight components to achieve the necessary viscosity. A greater portion of reactive thinners would, however, lead to a significantly larger portion of migration-capable components in case of UV hardening. To prevent the migration, all the monomers must be integrated by the polymerisation mechanism with the electron beam hardening according to the present invention. This requires a perfect balance of radiation dose, reactivity, and viscosity of the inkjet ink according to the present invention.

The inks according to the present invention have a high portion of reactive thinners and a small portion of prepolymers or oligomers. They are also free of photoinitiators. "Reactive thinners" as used below means thinners and solvents which are an integral part of the binder during the formation of a film or the hardening process by a chemical reaction.

In an embodiment of the present invention, the inks contain 30 to 89 wt.-% of reactive thinners based on the total weight of the ink. Suitable reactive thinners are, for example, dipropylene glycol diacrylate, tripropylene glycol diacrylate, tetra hydrofurfuryl acrylate, isobornyl acrylate, isodecyl acrylate, ethylene ethyl acrylate EEA, hexandiol diacrylate, tricyclodecane dimethanol diacrylate, propoxylated neopentyl glycol diacrylate and proxylated trimethylolpropane triacrylate. For example, dipropylene glycol diacrylate, 1,6-hexandiol diacrylate, tricyclodecane dimethanol diacrylate, propoxylated neopentyl glycol diacrylate and proxylated trimethylol propane triacrylate can be used.

In an embodiment of the present invention, the inks can, for example, contain at least two further solvents. To keep the necessary layer thicknesses of the hardened ink layer below 30 µm, and in package printing of below even 10 µm, the inks according to the present invention may contain reactive thinners in suitable solvents. The inks of the present invention thereby contain 5 to 25 wt.-% of reactive thinners and additionally 25 to 84 wt.-%, for example, 40 to 70 wt-%, for example, 50 to 60 wt.-% of a solvent mixture. During the hardening of the ink layers by means of electron radiation, and contrary to hardening by means of UV-radiation, no heat or infrared radiation exists which can be used to evaporate or air the solvents. The airing of the solvents used in the inks must, however, be possible within an acceptable time and accordingly an acceptable distance length in the case of inline printing processes in manufacturing processes. The solvents used also must be compatible with the other components of the inks, in particular with pigment dispersions. Suitable solvents according to the present invention therefore have properties which can be specified by the values of their evaporation rates VD, their boiling points, and their dielectricity constants or relative permittivity numbers $\in_r$. Suitable solvents have an evaporation rate in the range of 3 to 5000, for example, 3 to 500, for example, 3 to 50. The evaporation rate VD is the ratio between the evaporation time of the liquid substance or of the liquid preparation and the evaporation time of the reference liquid diethyl ether, respectively, at room temperature and at normal pressure. The evaporation time is therefore the time required by the liquid to evaporate below its boiling point.

The solvents used according to the present invention also have a boiling point in the range of 50 to 300° C., for example, 75 to 200° C., for example, 80 to 100° C. They also have dielectricity constants $\in_r$ in the range of 5 to 20, for example, 5 to 15, for example, 5 to 13.

The open-nozzle-time of the ink according to the present invention is greater than 1 minute, for example, greater than 15 minutes. The Open-Nozzle-Time is therefore the time span during which the ink maintains the viscosity corresponding to the print head specification when the print head is inactive. When the print head is inactive, the evaporation of the solvents may increase the viscosity so that when the print head activity resumes, the ink can no longer be ejected straightaway.

In an embodiment of the present invention, at least two solvents are combined with different evaporation rates, whereas one of both values is greater than the other one by a factor 2 to 10. Both solvents are thereby used in a proportion of 0.25:1 to 1:2.5. In an embodiment of the present invention, ester, ether and ketone can, for example, be used. The following can, for example, be used: methylisobutyl ketone, cyclohexanone, propylene glycol monomethyl ether, propylene glycol monoethyl ether, propylene glycol mono-n-butyl ether, ethylene glycol monomethyl ether, ethylene glycol monoethyl ether, ethylene glycol mono-n-butylether, dipropylene glycolmonomethyl ether, dipropylene glycol dimethyl ether, dipropylene glycol mono-n-butyl ether, diethylene glycol monomethyl ether, diethylene glycol mono-n-butyl ether, tripropylene-glycol monomethyl ether, butoxyethyl acetate, methoxypropyl acetate, ethyl glycol acetate, butyl diglycol acetate, ethyl diglycol acetate, dipropylene glycol methyl ether acetate, ethyl acetate, n-propyl acetate, iso-propyl acetate, n-butyl acetate, methyl lactate, ethyl lactate and ethylene glycol diacetate.

The inks according to the present invention can, for example, contain 10 to 40 wt.-%, for example, 25 to 35 wt.-%, for example, 20 to 30 wt.-% of oligomers or prepolymers based on the total weight of the ink. Suitable oligomers are, for example, aliphatic and aromatic urethane acrylates, polyether acrylates and epoxy acrylates, whereas the acrylates can be mono- or polyfunctional, for example, di-, tri- to hexa- and deca-functional. In an embodiment of the present invention, aliphatic and aromatic urethane acrylates can, for example, be used.

The inks according to the present invention contain 1 to 15 wt.-% of pigments based on the total weight of the ink. Suitable pigments are, for example, Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6. The particle sizes of the pigment used lie in the range of 10 to 1000 nm. In an embodiment of the present invention, pigments with particle sizes of 50 to 600 nm can, for example, be used to achieve the stability and the desired tinctorial strength.

Further additives can be added to the inks to adjust properties, such as, for example, dispersing additives, wetting agents, polymerisation inhibitors, defoamers and UV absorbers. Contrary to the usual UV hardened inks, UV absorbers can be applied in the inks according to the present invention so as to improve the light stability of the hardened film. The inks according to the present invention contain up to 5 wt.-% of additives based on the total weight of the formulation.

Since the inks according to the present invention have no photoinitiators, they can in particular be used for printing on substrates and materials which are employed in health-critical sectors. Printing on food packages and children's toys is an example. The inks according to the present invention can in particular be used in inkjet printing methods for printing synthetic materials and synthetic films, such as, for example, for printing polyethylene (PE), polypropylene (PP), polyvinylchloride (PVC), acrylnitrile butadiene styrol-copolymer Copolymerisat (ABS) or polyethylene terephthalate (PET).

The present invention also provides a method for producing color coats on substrates or on substrate surfaces which has the following phases. In a phase a), one or several of the inks according to the present invention are applied to the substrate surface by means of inkjet technology. In a phase b), the inks applied are then exposed to an electron radiation and hardened.

The electron radiation employed according to the present invention to harden the inkjet inks allows the use of photoinitiators to be dispensed with. The radiation is generated by an electron source for shooting electrons with determined intensity to the layer to be hardened. Parameters such as electron density and electron velocity, which determine the depth of penetration of radiation in the substrate, can be adapted to the desired process.

Electrons are energy-richer than UV light and are therefore able to split the acrylate bonds directly in the inks according to the present invention. The hardening takes place exclusively by exciting and reacting the acrylate bonds. Since the reaction products of the acrylates are defined, no formation of undesirable migration-capable by-products occurs during the electron beam hardening. The reaction kinetics of the hardening processes according to the present invention differs significantly from the kinetics of UV-hardening systems since other radicals are generated by the fission of photoinitiators than with the electron beam hardening used according to the present invention.

Another advantage of the electron beam hardening is that the fission can penetrate by few microns into the substrate. An ink which is sucked up into the substrate can therefore be hardened completely.

Dependant on the dose, which is the most important parameter during the electron beam hardening, the fission penetrates a few microns into the surface of the irradiated substrate. Normal dose values therefore range between 10 and 200 kGy, for example, 50 and 100 kGy. The energy dose is here specified in Gray (Gy). This parameter specifies the energy dose caused by ionising radiation and describes the energy absorbed per mass. It is the quotient of the absorbed energy in Joules and of the mass of the body in kg: 1 Gy=1 J/kg.

The depth of penetration hence depends on the substrate or of the coating. It can reach 100 μm. Contrary to the UV hardening, where the coating penetrates and evades the influence of the light for hardening on porous subsoils or substrates, the reactive centers situated in the surface of the substrates can also form radicals by using the electron radiation according to the present invention and also harden the varnish coat.

The printing method according to the present invention is therefore not only suitable for printing on substrates with nonporous surfaces, such as, for example, synthetic material, glass, metal or ceramics, but also for printing on porous and/or open cell substrates or surfaces. Color coats with equal quality can be obtained without changing the inks. Suitable porous and/or open-cell materials or substrates are, for example, open-cell foams, open-pored ceramics and glasses, wood, coated and uncoated papers like journal papers or office papers. Suitable nonporous materials or substrates are, for example, the films already mentioned consisting of synthetic materials like polyethylene (PE), polypropylene (PP), polyvinylchloride (PVC) acrylnitrile butadiene styrol copolymers (ABS) or polyethylene terephthalate (PET).

The great depth of penetration of the electron radiation does not prevent the hardening of the ink layer even by the formation of shadow zones on the surface. The method according to the present invention is therefore suitable for printing on structured surfaces, such as, for example, grained or relief-like surfaces, or for printing on three-dimensional formed surfaces, such as, for example, curved surfaces.

The inks can be applied according to the present invention in a multi-pass or in a single-pass-method. With the multi-pass method, every line to be printed is coated several times by the printing unit, whereas a pattern or picture is constructed in several steps. The advantage of this technique is the high picture quality, the shortcoming is the slow speed. In industrial processes, the single-pass method can, for example, be used, in which every line to be printed is only coated once by the printing unit. This enables high printing speeds of above 100 m/min to be reached.

The selection of suitable reactive thinners and solvents enables the kinetics of the hardening reaction of the ink to be adapted to the method. It should here be noted that in the single-pass method, the surface is irradiated only once, and that the printing layer has thereafter reached its final state.

With the usual UV-hardening printing method, the hardening of the ink layer applied must take place 5 to 10 seconds at the latest after being applied in order to prevent or to minimise any running of the ink. With porous or absorbent substrates, the hardening must take place significantly faster than with nonporous substrates so as to prevent the penetration of the ink. The great depth of penetration of the electron radiation used according to the present invention enables the inks to harden even in deeper layers of the substrate so that good results can be achieved even with a delayed hardening, for example, by 15 seconds, with the formation of shadow zones on structured surfaces or with the penetration of the ink on absorbent substrates.

The hardening according to the present invention can take place with speeds up to 100 m per minute so that usual printing speeds are covered by commercially available inkjet printers. The method according to the present invention is also suitable for in-line usage in manufacturing processes. In a single-pass method, printing speeds of up to 100 m/min which are necessary for in-line usage can in particular be realised.

In an embodiment of the printing method according to the present invention, the substrate to be printed is conveyed to the printing unit by a transport system, such as, for example, a conveyor belt, a carriage, or a roll-to-roll system. The inks according to the present invention are applied in the printing unit by means of inkjet methods. After application of the inkjet inks, the substrate is conveyed to a radiation source via the transport system, and the inks applied are hardened by the effect of electron radiation. The distance travelled by the substrate between the printing unit and the radiation source serves as a flash-off zone in which the solvents contained in the inks evaporate. The distance length and the advance speed enable the time span available for evaporating the solvents used to be calculated. The printing methods according to the present invention are operated at advance speeds of 1 to more than 100 m/min, for example, of 20 to 100 m/min. The interval between the printing unit and the radiation source, which corresponds to the distance travelled by the substrate between the application and the hardening of the inks, ranges between less than 0.01 and 2 m, for example, between 0.01 to 1 m. The result is accordingly a flash-off time of 0.001 to 10 s, for example, of 0.01 to 5 s.

In an embodiment of the method according to the present invention, the phase a) of the application of the inks is preceded by a phase in which the substrate is first printed by means of a first printing unit with at least one white ink. Only after the application of the white ink or inks are additional inks (which produce the actual picture or pattern) applied in a wet-on-wet method, i.e., without hardening of the first, white ink layer. All the inks applied are then hardened.

The distance travelled by the substrate between both printing units is then used as a flash-off zone in which the solvents of the initially applied white inks can evaporate. The interval between the first and the second printing unit thereby ranges in the range of below 0.01 to 2 m, for example, 0.01 to 1 m. The result is a flash-off time of 0.001 to 10 s, for example, 0.01 to 5 s.

Print heads can be used as printing units in the method according to the present invention as is usual in the industrial inkjet printing. Typical parameters, such as, for example, the viscosity of the inks, drop speed, print head temperature, control voltage and control pulse width, can be adjusted according to the specification of the print head. The print heads suitable for usage in the method according to the present invention have a droplet size in the range of 4 to 80 μm, a droplet frequency in the range of 20 to 40 kHz, and a nozzle-open-time over 1 minute, for example, over 15 minutes.

EXAMPLES

Ink

| Substance | Quantity in weight portions |
| --- | --- |
| Pigment | 4 |
| Reactive thinners | 24 |
| Oligomers | 20.5 |
| Solvent mixture | 50 |
| Polymerisation inhibitor | 0.2 |
| Wetting agent | 0.1 |
| Polymeric dispersing additive | 1.2 |

Printing Method

The inks according to the present invention were printed on a technical installation with single-pass-4-color inkjet printing unit. Underprinting took place without white and with white. The hardening was performed on a separate installation. The hardening was realised depending on the printing speed of between 2 and 5 seconds after printing.

Substrate: Natural white paper
  Polycarbonate foil
  Polypropylene foil, 50 microns
  Printing speed: 60 m/min
  Residual oxygen content: 5-15 ppm
  Radiation dose: 50 keV The patterns were printed in a 4-color printing process with a test pattern and werethen hardened. The samples obtained showed an excellent adherence on all media, with hard surfaces and without odors.

Comparison of the Emissions from Coated Substrates

The emission from coated substrates, which were hardened by means of UV-radiation (Sample 1) and by means of electron radiation (Sample 2), was determined by a screening analysis of volatile organic compounds and low to mid-volatile compounds by means of thermo-extraction and subsequent thermodesorption GC/MS. The volatile components of the sample (weight of sample taken approximately 0.2 g) were extracted at 100° C. for 20 minutes, and the volatile components were enriched on a small tube filled with an adsorption material. The small adsorption tube was then desorbed, the analytes separated by gas chromatography, and identified by mass spectrometry.

The following compounds were identified by comparison with spectra libraries and quantified as a d-toluol equivalent (d-TE):

| Reaction component | Sample 1 Emission in mg per kg substrate | Sample 2 Emission in mg per kg substrate |
| --- | --- | --- |
| Isobornyl acrylate | 14 | 0 |
| Dipropylene diglycol diacrylate | 15 | 0 |
| Tricyclodecane dimethanol diacrylate | 5 | 0 |

The present invention is not limited to embodiments described herein; reference should be had to the appended claims.

What is claimed is:

1. An inkjet ink which is electron beam curable, the inkjet ink comprising:
   10 to 40 wt.-% of at least one oligomer based on a total weight of the inkjet ink;
   5 to 25 wt.-% of at least one reactive thinner based on the total weight of the inkjet ink;
   25 to 84 wt.-% of a solvent mixture comprising at least two solvents based on the total weight of the inkjet ink, the at least two solvents having a boiling point of from 50 to 300° C., a dielectricity constant of from 5 to 20, and an evaporation rate of 3 to 5000, wherein the evaporation rate of the at least two solvents differs by a factor of from 2 to 10; and
   1 to 15 wt.-% of at least one pigment based on the total weight of the inkjet ink;
   wherein, the inkjet ink is free from photoinitiators.

2. The inkjet ink as recited in claim 1, wherein the inkjet ink comprises the at least two solvents in a proportion of from 0.25:1 to 1:2.5.

3. The inkjet ink as recited in claim 1, wherein the at least one oligomer is selected from aliphatic urethane acrylates, aromatic urethane acrylates, polyether acrylates, and epoxy acrylates, wherein the aliphatic urethane acrylates, the aromatic urethane acrylates, the polyether acrylates, and the epoxy acrylates acrylates are monofunctional or polyfunctional.

4. The inkjet ink as recited in claim 1, wherein the at least one reactive thinner is selected from dipropylene glycol diacrylate, tripropylene glycol diacrylate, tetra hydrofurfuryl acrylate, isobornyl acrylate, isodecyl acrylate, ethylene ethyl acrylate, hexandiol diacrylate, tricyclodecane dimethanol diacrylate, propoxylated neopentyl glycol diacrylate, and proxylated trimethylol propane triacrylate.

5. The inkjet ink as recited in claim 1, wherein the at least two solvents are selected from methyl isobutyl ketone, cyclohexanone, propylene glycol monomethyl ether, propylene glycol monoethyl ether, propylene glycol mono-n-butyl ether, ethylene glycol monomethyl ether, ethylene glycol monoethyl ether, ethylene glycol mono-n-butyl ether, dipropylene glycol monomethyl ether, dipropylene glycol dimethyl ether, dipropylene glycol mono-n-butylether, diethylene glycol monomethyl ether, diethylene glycol mono-n-butyl ether, tripropylene glycol monomethyl ether, butoxy ethyl acetate, methoxy propyl acetate, ethyl glycol acetate, butyl diglycol acetate, ethyl diglycol acetate, dipropylene glycol methyl ether acetate, ethyl acetate, n-propyl acetate, iso-propyl acetate, n-butyl acetate, methyl lactate, ethyl lactate, and ethylene glycol diacetate.

6. The inkjet ink as recited in claim 1, wherein the at least one pigment has a particle size in the range of from 10 to 1000 nm.

7. The inkjet ink as recited in claim 6, wherein the at least one pigment has a particle size range of from 50 to 600 nm.

8. A method of using the inkjet ink as recited in claim 1 to print a food package and a toy, the method comprising:
   providing the inkjet ink as recited in claim 1; and
   using the inkjet ink to print at least one of the food package and the toy.

9. A method for producing a color coat on a substrate surface, the method comprising:
   providing at least one inkjet ink which is free of photoinitiators, the at least one inkjet ink comprising,
   10 to 40 wt.-% of at least one oligomer based on a total weight of the inkjet ink,
   5 to 25 wt.-% of at least one reactive thinner based on the total weight of the inkjet ink,
   25 to 84 wt.-% of a solvent mixture comprising at least two solvents based on the total weight of the inkjet ink, the at least two solvents having a boiling point of from 50 to 300° C., a dielectricity constant of from 5 to 20, and an evaporation rate of 3 to 5000, wherein the evaporation rate of the at least two solvents differs by a factor of from 2 to 10, and
   1 to 15 wt.-% of at least one pigment based on the total weight of the inkjet ink,
   applying the at least one inkjet ink on the substrate surface with an inkjet technology; and
   hardening the at least one inkjet ink by exposing the at least one inkjet ink applied to a dose of an electron radiation in the range of 10 to 200 kGy.

10. The method as recited in claim 9, wherein the at least one inkjet ink comprises the at least two solvents in a proportion of from 0.25:1 to 1:2.5.

11. The method as recited in claim 9, wherein the applying of the at least one inkjet ink is performed in a single-pass method or in a multi-pass method.

12. The method as recited in claim 9, wherein the substrate surface comprises a three-dimensionally structured surface.

13. The method as recited in claim 9, wherein the substrate surface comprises at least one of a porous surface, an open-cell surface, and an absorbent material.

14. The method as recited in claim 9, wherein a time span between the applying of the at least one inkjet ink and the hardening of the at least one inkjet ink ranges from 0.001 to 10 seconds.

15. The method as recited in claim 9, the method further comprising:
   providing an ink comprising a white ink; and
   applying a first coat comprising the ink comprising the white ink before the applying of the at least one inkjet ink.

16. The method as recited in claim 15, wherein a time span between the applying of the first coat comprising the ink comprising the white ink and the applying of the at least one inkjet ink ranges from 0.001 to 10 seconds.

* * * * *